United States Patent
Nemoto

(10) Patent No.: US 10,303,634 B2
(45) Date of Patent: May 28, 2019

(54) ELECTRONIC DEVICE THAT CAN PERFORM COMMUNICATIONS BASED ON A PLURALITY OF COMMUNICATION STANDARDS, CONTROL METHOD FOR THE ELECTRONIC DEVICE, AND RECORDING MEDIUM

(71) Applicant: CANON KABUSHIKI KAISHA, Tokyo (JP)

(72) Inventor: Ayumu Nemoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/636,495

(22) Filed: Jun. 28, 2017

(65) Prior Publication Data

US 2018/0004694 A1    Jan. 4, 2018

(30) Foreign Application Priority Data

Jul. 4, 2016    (JP) ................................. 2016-132620

(51) Int. Cl.
| | | |
|---|---|---|
| *G06F 13/38* | (2006.01) | |
| *G06F 11/30* | (2006.01) | |
| *G06F 13/40* | (2006.01) | |
| *G06F 13/42* | (2006.01) | |
| *H04N 5/232* | (2006.01) | |

(52) U.S. Cl.
CPC ........ *G06F 13/385* (2013.01); *G06F 11/3027* (2013.01); *G06F 11/3041* (2013.01); *G06F 11/3051* (2013.01); *G06F 13/4081* (2013.01); *G06F 13/4282* (2013.01); *G06F 13/4022* (2013.01); *H04N 5/23203* (2013.01)

(58) Field of Classification Search
CPC ..... G06F 3/00; G06F 13/4081; G06F 13/4022
See application file for complete search history.

(56) References Cited

U.S. PATENT DOCUMENTS

| 2009/0089850 A1* | 4/2009 | Nakajima | ............. | H04N 5/775 |
| | | | | 725/118 |
| 2009/0141180 A1* | 6/2009 | Kondo | .................. | G09G 5/006 |
| | | | | 348/723 |

(Continued)

FOREIGN PATENT DOCUMENTS

JP    2013-11989 A    1/2013

*Primary Examiner* — Farley Abad
*Assistant Examiner* — Getente A Yimer
(74) *Attorney, Agent, or Firm* — Canon U.S.A., Inc. IP Division

(57) ABSTRACT

An electronic device includes a connector constituted by plural types of pins and configured to perform a communication in accordance with at least one of a first communication standard for requesting a symmetrical pin arrangement and a second communication standard for requesting an asymmetrical pin arrangement, an input unit configured to input a signal for detecting that an external apparatus connected to the connector is an apparatus in conformity to the first communication standard or the second communication standard via at least one of the pins in the connector, and a control unit configured to perform control in a manner that signal assignment of the plural types of the pins of the connector is switched to a first state corresponding to the first communication standard or a second state corresponding to the second communication standard in accordance with the signal input by the input unit.

11 Claims, 12 Drawing Sheets

(56) References Cited

U.S. PATENT DOCUMENTS

| | | | |
|---|---|---|---|
| 2010/0118927 A1* | 5/2010 | Ichimura | H04L 5/1423 |
| | | | 375/220 |
| 2010/0275234 A1* | 10/2010 | Kamon | H04N 5/775 |
| | | | 725/58 |
| 2012/0203937 A1* | 8/2012 | Mohanty | G06F 13/385 |
| | | | 710/16 |
| 2017/0139871 A1* | 5/2017 | Yeh | G06F 13/4081 |

* cited by examiner

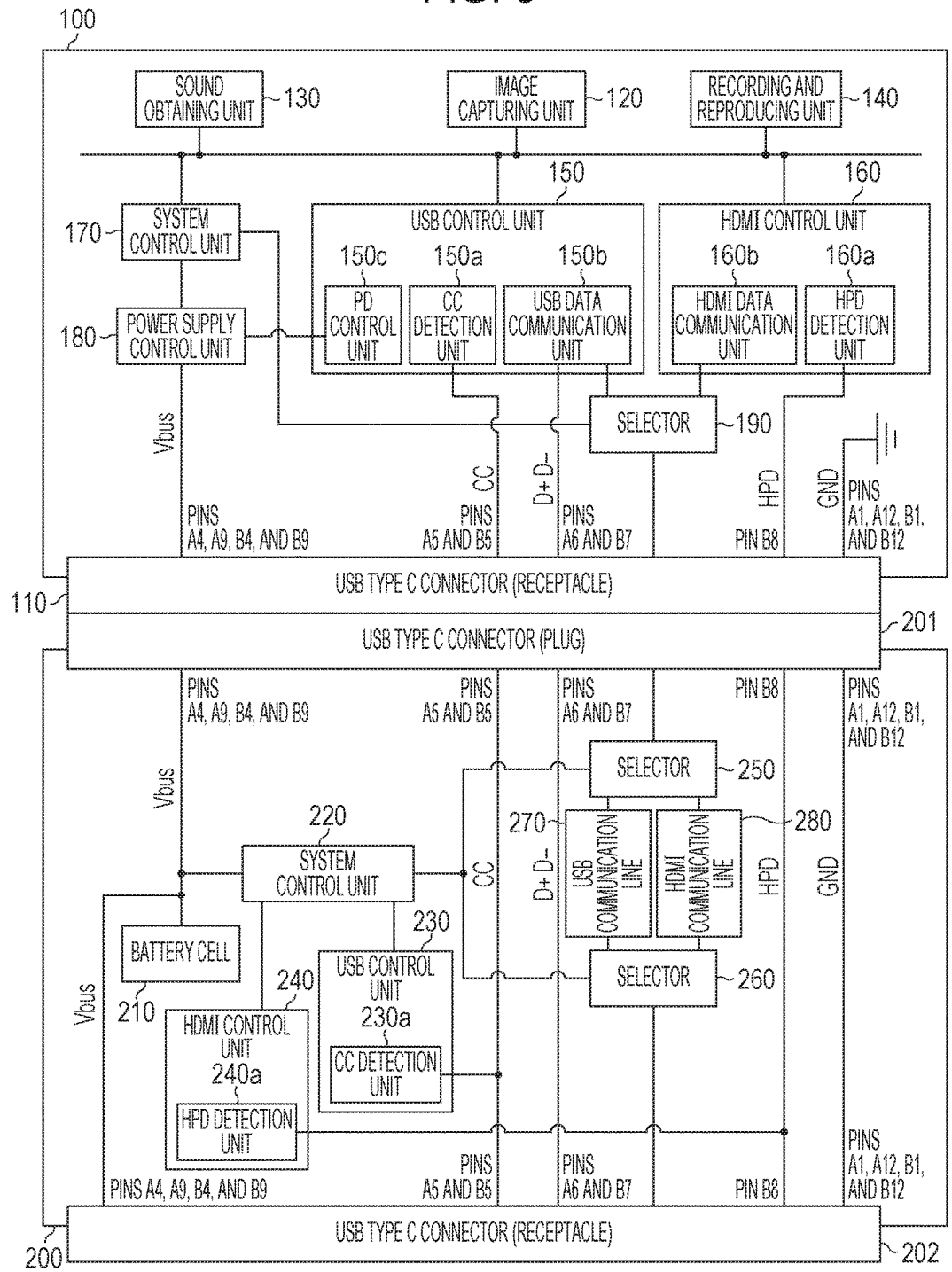

FIG. 5A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC | D+ | D− | SBU1 | VBUS | RX2− | RX2+ | GND |
| GND | RX1+ | RX1− | VBUS | SBU2 | D− | D+ | CC | VBUS | TX2− | TX2+ | GND |
| B12 | B11 | B10 | B9 | B8 | B7 | B6 | B5 | B4 | B3 | B2 | B1 |

FIG. 5B

| A1 | A2 | A3 | A4 | A5 | A6 | A7 | A8 | A9 | A10 | A11 | A12 |
|---|---|---|---|---|---|---|---|---|---|---|---|
| GND | TMDS Data0+ | TMDS Data0− | VBUS | CC | D+ | D− | SBU1 | VBUS | TMDS Data2+ | TMDS Data2− | GND |
| GND | TMDS Data1+ | TMDS Data1− | VBUS | HPD | SDA | SCL | CC | VBUS | TMDS CLOCK1+ | TMDS CLOCK1− | GND |
| B12 | B11 | B10 | B9 | B8 | B7 | B6 | B5 | B4 | B3 | B2 | B1 |

FIG. 5C

| A1 | A2 | A3 | A4 | A5 | A6 | A7 | A8 | A9 | A10 | A11 | A12 |
|---|---|---|---|---|---|---|---|---|---|---|---|
| GND |  |  | VBUS | CC |  |  | SBU1 | VBUS |  |  | GND |
| GND |  |  | VBUS | HPD |  |  | CC | VBUS |  |  | GND |
| B12 | B11 | B10 | B9 | B8 | B7 | B6 | B5 | B4 | B3 | B2 | B1 |

FIG. 6A

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2− | V$_{BUS}$ | SBU1 | D− | D+ | CC | V$_{BUS}$ | TX1− | TX1+ | GND |

| B1 | B2 | B3 | B4 | B5 | B6 | B7 | B8 | B9 | B10 | B11 | B12 |
|---|---|---|---|---|---|---|---|---|---|---|---|
| GND | TX2+ | TX2− | V$_{BUS}$ | CC | D+ | D− | SBU2 | V$_{BUS}$ | RX1− | RX1+ | GND |

FIG. 6B

| A12 | A11 | A10 | A9 | A8 | A7 | A6 | A5 | A4 | A3 | A2 | A1 |
|---|---|---|---|---|---|---|---|---|---|---|---|
| GND | TMDS Data2− | TMDS Data2+ | V$_{BUS}$ | SBU1 | D− | D+ | CC | V$_{BUS}$ | TMDS Data0− | TMDS Data0+ | GND |

| B1 | B2 | B3 | B4 | B5 | B6 | B7 | B8 | B9 | B10 | B11 | B12 |
|---|---|---|---|---|---|---|---|---|---|---|---|
| GND | TMDS CLOCK1− | TMDS CLOCK1+ | V$_{BUS}$ | CC | SCL | SDA | HPD | V$_{BUS}$ | TMDS Data1− | TMDS Data1+ | GND |

FIG. 6C

| A12 | A11 | A10 | A9 | A8 | A7 | A6 | A5 | A4 | A3 | A2 | A1 |
|---|---|---|---|---|---|---|---|---|---|---|---|
| GND |  |  | V$_{BUS}$ | SBU1 | D− | D+ | CC | V$_{BUS}$ |  |  | GND |

| B1 | B2 | B3 | B4 | B5 | B6 | B7 | B8 | B9 | B10 | B11 | B12 |
|---|---|---|---|---|---|---|---|---|---|---|---|
| GND |  |  | V$_{BUS}$ | CC |  |  | HPD | V$_{BUS}$ |  |  | GND |

FIG. 7

| PIN NUMBER | SIGNAL | PIN NUMBER | SIGNAL |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved(NC)/Utility |
| 15 | SCL | 16 | SDA |
| 17 | DDC/CEC Ground | 18 | +5 V Power |
| 19 | Hot Plug Detect | | |

ELECTRONIC DEVICE THAT CAN PERFORM COMMUNICATIONS BASED ON A PLURALITY OF COMMUNICATION STANDARDS, CONTROL METHOD FOR THE ELECTRONIC DEVICE, AND RECORDING MEDIUM

BACKGROUND

Field of the Disclosure

The present disclosure particularly relates to an electronic device that can perform communications based on a plurality of communication standards, a control method for the electronic device, and a recording medium.

Description of the Related Art

As digital cameras of recent years, ones provided with a universal serial bus (USB) corresponding to a general-use connector as a communication interface (I/F) connector have been proposed. Among those digital cameras, some include a communication interface (I/F) for a video device such as a television monitor in addition to the USB connector. A High-Definition Multimedia Interface (HDMI (registered trademark)) connector with which high-definition transmission can be realized is proposed as the above-described communication interface (I/F).

On the other hand, in an electronic device such as a digital camera where miniaturization and thinning are demanded to increase portability, the provision of the plurality of connectors such as the USB connector and the HDMI connector described above hinders the miniaturization. In view of the above, a technology has been proposed which the number of connectors included in the electronic device such as the digital camera is decreased, and a communication in conformity to one standard and the other standard can be performed by using a single connector.

For example, in an electronic device described in Japanese Patent Laid-Open No. 2013-11989, when a connection is established to an external apparatus, the single USB connector can be selectively connected to either a signal processing circuit for USB signals or a signal processing circuit for RS-232C signals. According to this technology, a connection destination of each pin of the USB connector is switched to the USB signal processing circuit or the RS-232C signal processing circuit by a switching control using a switch. In addition, Japanese Patent Laid-Open No. 2013-11989 also describes a configuration in which a failure of the apparatus caused by collisions of different signals against each other is avoided in a case where a communication mode selected by the switching control is not matched with a communication standard of the external apparatus. For example, a pin (input pin or terminal) of the USB connector to which an output pin of the external apparatus is connected is set to be the input pin also at a destination of the switching switched by the switching control. With the above-described configuration, the failure of the apparatus caused by the collisions of the different signals against each other is avoided.

However, according to a method described in Japanese Patent Laid-Open No. 2013-11989, the switching destination of each of the USB connector needs to be limited to avoid the failure of the apparatus caused by the signal collisions, and a degree of design freedom is not sufficient since the connector pin is not effectively used.

SUMMARY

An electronic device according to an aspect of the present disclosure includes a connector constituted by plural types of pins and configured to perform a communication in accordance with at least one of a first communication standard for requesting a symmetrical pin arrangement and a second communication standard for requesting an asymmetrical pin arrangement, an input unit configured to input a signal for detecting that an external apparatus connected to the connector is an apparatus in conformity to the first communication standard or the second communication standard via at least one of the pins in the connector, and a control unit configured to perform control in a manner that signal assignment of the plural types of the pins of the connector is switched to a first state corresponding to the first communication standard or a second state corresponding to the second communication standard in accordance with the signal input by the input unit.

Further features of the present disclosure will become apparent from the following description of exemplary embodiments with reference to the attached drawings.

BRIEF DESCRIPTION OF THE DRAWINGS

FIG. 3 is a block diagram illustrating internal configuration examples of the digital camera and the battery unit according to one or more aspects of the present disclosure.

FIGS. 5A to 5C illustrate assignment of signals to respective pins of a USB TYPE C connector (receptacle) according to one or more aspects of the present disclosure.

FIGS. 6A to 6C illustrate assignment of signals to respective pins of a USB TYPE C connector (plug) according to one or more aspects of the present disclosure.

FIG. 7 is an explanatory diagram for describing assignment of signals to respective pins of HDMI according to one or more aspects of the present disclosure.

DESCRIPTION OF THE EMBODIMENTS

Hereinafter, exemplary embodiments of the present disclosure will be described with respect to the drawings. According to the present exemplary embodiment, a communication device that performs communications based on two standards including a USB TYPE C standard (first standard) and an HDMI standard (second standard) will be described. On the other hand, the USB TYPE C standard and the HDMI standard are examples, and a first exemplary embodiment may be applied to standards other than the above-described standards.

Figure 1A:
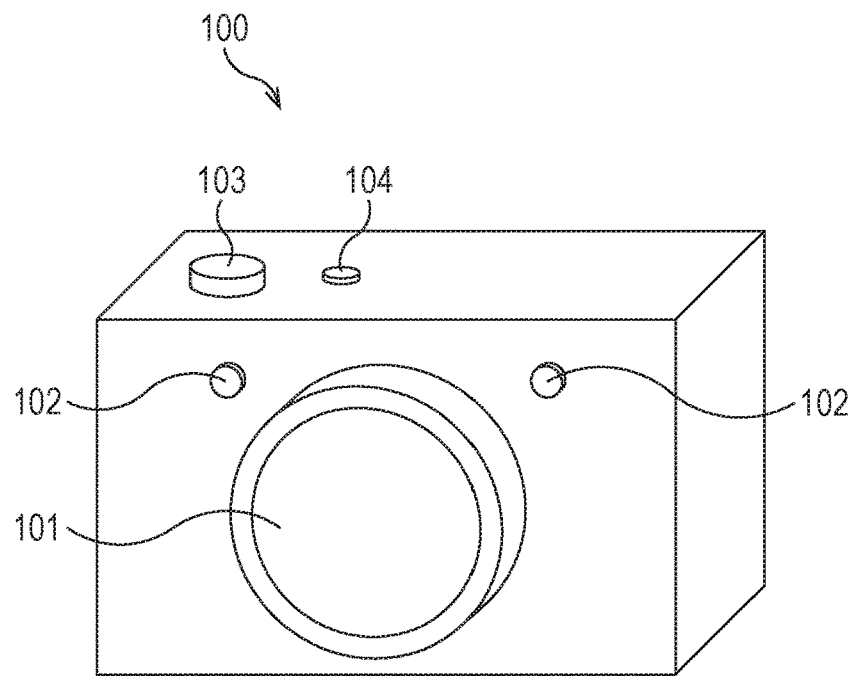
FIGS. 1A and 1B illustrate external configuration examples of a digital camera according to one or more aspects of the present disclosure.
Figure 1B:
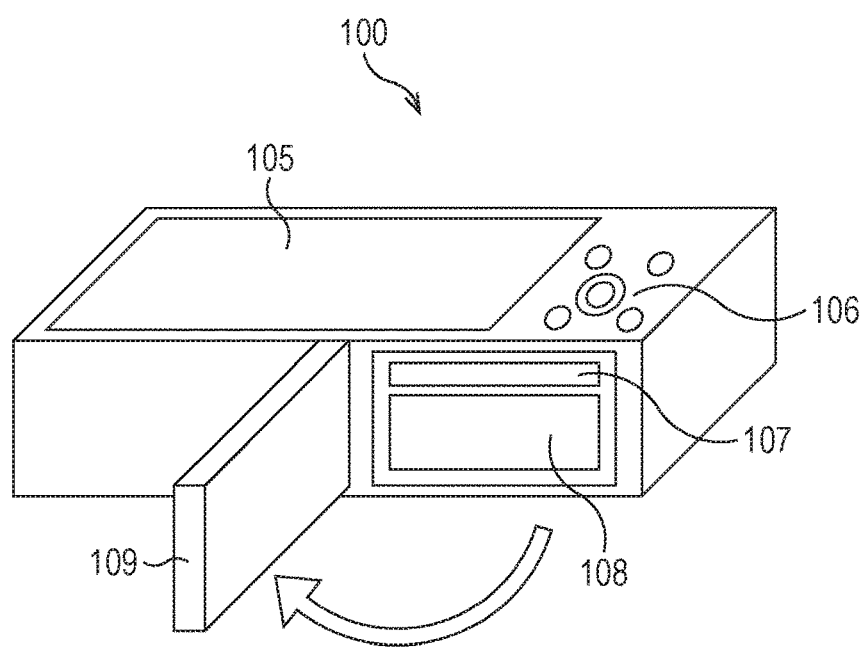

FIG. 1A is a perspective view of a digital camera 100 according to the present exemplary embodiment as viewed from a front side (object side), and FIG. 1B is a perspective view of the digital camera 100 illustrated in FIG. 1A as viewed from a bottom side.

As illustrated in FIG. 1A, a lens barrel 101 and a microphone 102 are arranged on a front side in the digital camera 100 according to the present exemplary embodiment. In addition, a release button 103, a power supply button 104, and the like are arranged on a top part of the digital camera 100.

As illustrated in FIG. 1B, a display unit 105 such as a liquid crystal display (LCD) is arranged on a bottom part of the digital camera 100. Various operation button groups 106 are arranged on a right side of the display unit 105 as viewed from the bottom of the digital camera 100. In addition, a recording medium accommodating chamber 107 that accommodates a recording medium such as various types of memory cards and a battery accommodating chamber 108 that accommodates a battery unit 200 which will be described below are arranged in the digital camera 100. A lid member 109 is arranged so as to cover the recording medium accommodating chamber 107 and the battery accommodating chamber 108 and attached to the digital camera 100 so as to be rotatable. As illustrated in FIG. 1B, the recording medium such as various types of memory cards and the battery unit 200 can be inserted and removed in a state in which the lid member 109 is open with respect to the digital camera 100.

The digital camera 100 also converts an object image that passes through the lens barrel 101 to be formed by an image sensor into an electric signal. The digital camera 100 can display the image on the display unit 105 and record the image as image data in a recording medium. In addition, a USB TYPE C connector (receptacle) which will be described below with reference to FIG. 3 is provided at the back of the battery accommodating chamber 108. The USB TYPE C connector (receptacle) is an only external interface connector of the digital camera 100. The digital camera 100 can perform exchange of power and data communication with a battery unit which will be described below and the other external apparatus via the USB TYPE C connector (receptacle).

Figure 2A:
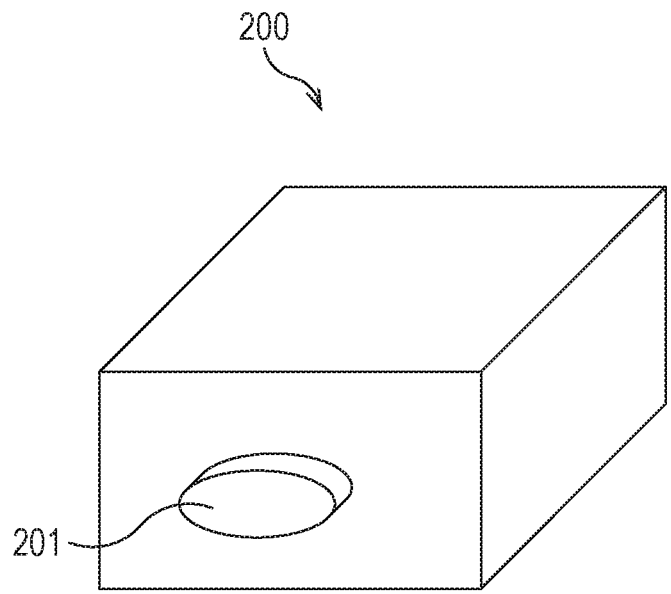
FIGS. 2A and 2B illustrate an external configuration example of a battery unit according to one or more aspects of the present disclosure.
Figure 2B:
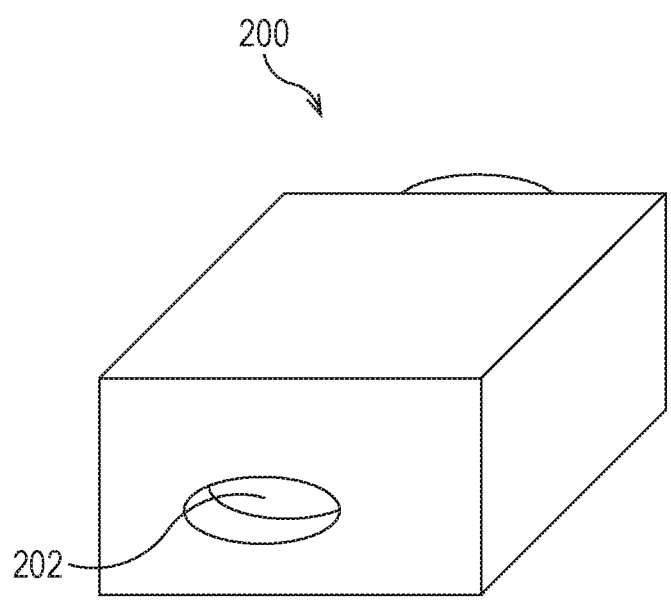

FIG. 2A is a perspective view of the battery unit 200 of the digital camera 100 according to the present exemplary embodiment as viewed from a top side, and FIG. 2B is a perspective view of the battery unit 200 illustrated in FIG. 2A as viewed from a bottom side.

As illustrated in FIG. 2A, a USB TYPE C connector (plug) 201 is provided in the top part of the battery unit 200 according to the present exemplary embodiment. When the USB TYPE C connector (plug) 201 is connected to the USB TYPE C connector (receptacle) arranged at the back of the battery accommodating chamber 108, power can be supplied from the battery unit 200 to the digital camera 100.

On the other hand, a USB TYPE C connector (receptacle) 202 is provided on a bottom side of the battery unit 200 as illustrated in FIG. 2B. The USB TYPE C connector (receptacle) 202 can be connected with an external apparatus including a USB TYPE C connector via various types of cables or the like. With this configuration, the digital camera 100 in a state of being connected with the battery unit 200 can also perform a communication with the external apparatus connected to the USB TYPE C connector (receptacle) 202 provided on the bottom of the battery unit 200.

Next, internal configurations of the digital camera 100 and the battery unit 200 according to the present exemplary embodiment will be described.

FIG. 3 is a block diagram illustrating internal configuration examples of the digital camera 100 and the battery unit 200 in a state in which the battery unit 200 is mounted to the digital camera 100. It should be noted that, in FIG. 3, only a functional block used to describe a feature of the present exemplary embodiment is illustrated, and a functional block that is not used for the description is omitted.

First, descriptions will be given of respective functional blocks of the digital camera 100.

In FIG. 3, the digital camera 100 includes an image capturing unit 120, a sound obtaining unit 130, and a recording and reproducing unit 140.

The image capturing unit 120 includes an image sensor configured to photoelectrically convert the object image formed by the lens barrel 101 and the like and obtains video data of still images and moving images. The sound obtaining unit 130 obtains sound data by using the microphone 102. The recording and reproducing unit 140 records the video data generated by the image capturing unit 120 and the sound data obtained by the sound obtaining unit 130 in the recording medium and reproduces the video data and the sound data from the recording medium.

In addition, the digital camera 100 includes a USB control unit 150 that can realize a data communication in conformity to the USB TYPE C standard and an HDMI control unit 160 that can realize a data communication in conformity to the HDMI standard.

The USB control unit 150 further includes a CC detection unit 150a, a USB data communication unit 150b, and a PD control unit 150c. The CC detection unit 150a detects a connection of the external apparatus in conformity to the USB TYPE C standard on the basis of a CC signal. The USB data communication unit 150b performs a data communication such as USB 2.0 or USB 3.1 in conformity to the USB TYPE C standard. The PD control unit 150c executes a predetermined negotiation (feeding negotiation) corresponding to a USB Power Delivery (USB PD) standard between the digital camera 100 and the external apparatus.

On the other hand, the HDMI control unit 160 further includes a hot plug detect (HPD) detection unit 160a and an HDMI data communication unit 160b. The HPD detection unit 160a detects a connection of the external apparatus in conformity to the HDMI standard on the basis of an HPD signal. The HDMI data communication unit 160b transmits the video data and the sound data via a TMDS line. In addition, the HDMI data communication unit 160b can transmit the video data and the sound data reproduced from the recording medium or the like by the recording and reproducing unit 140. Furthermore, the HDMI data communication unit 160b can also perform streaming transmission of the video data and the sound data obtained by the image capturing unit 120 and the sound obtaining unit 130 in real time.

Furthermore, the digital camera 100 includes a system control unit 170 configured to govern various controls of the main body of the digital camera 100 and a power supply control unit 180. The power supply control unit 180 supplies the power received from the battery unit 200 functioning as a power supply unit or the external apparatus supporting the USB PD standard via a power supply line (Vbus) to the respective circuit elements.

Furthermore, the digital camera 100 includes a selector 190. The selector 190 plays a role of switching assignment of a signal at a predetermined pin (switching pin) which will be described below in the USB TYPE C connector 110 on the basis of an instruction of the system control unit 170. When the switching destination of the switching pin is switched to the USB data communication unit 150*b* or the HDMI data communication unit 160*b* by the selector 190, the digital camera 100 can perform either the communication in conformity to the USB standard or the communication in conformity to the HDMI standard. The assignment of the predetermined signal to each pin in the USB TYPE C connector 110 will be described below.

Next, descriptions will be given of respective functional blocks of the battery unit 200.

In FIG. 3, the battery unit 200 includes a battery cell 210, a system control unit 220, a USB control unit 230, and an HDMI control unit 240.

The battery cell 210 is constituted by a rechargeable secondary battery (for example, lithium ion) or the like. The system control unit 220 governs various controls of the battery unit 200.

The USB control unit 230 further includes a CC detection unit 230*a*. The CC detection unit 230*a* detects a connection of the external apparatus in conformity to the USB TYPE C standard on the basis of the CC signal. On the other hand, the HDMI control unit 240 further includes an HPD detection unit 240*a*. The HPD detection unit 240*a* detects a connection of the external apparatus in conformity to the HDMI standard on the basis of the HPD signal.

The battery unit 200 further includes two selectors 250 and 260.

The selector 250 plays a role of switching assignment of a signal at a predetermined pin (switching pin) which will be described below in the USB TYPE C connector (plug) 201 on the basis of an instruction of the system control unit 220. The selector 260 plays a role of switching assignment of a signal at a predetermined pin (switching pin) which will be described below in the USB TYPE C connector (receptacle) 202 on the basis of an instruction of the system control unit 220. With the use of the two selectors 250 and 260, the switching destination of the switching pin of each of the USB TYPE C connectors can be switched to a USB communication line 270 or an HDMI communication line 280. With this configuration, the battery unit 200 can perform the signal transmission in conformity to either the communication in conformity to the USB standard or the communication in conformity to the HDMI standard. The assignment of the signal to the predetermined pin in the USB TYPE C connector (plug) 201 and the USB TYPE C connector (receptacle) 202 will be described below.

The digital camera 100 according to the present exemplary embodiment can perform the communication in conformity to the USB TYPE C standard or the HDMI standard with the external apparatus connected to the USB TYPE C connector 202 while the three selectors 190, 250, and 260 are appropriately switched.

Figure 4A:
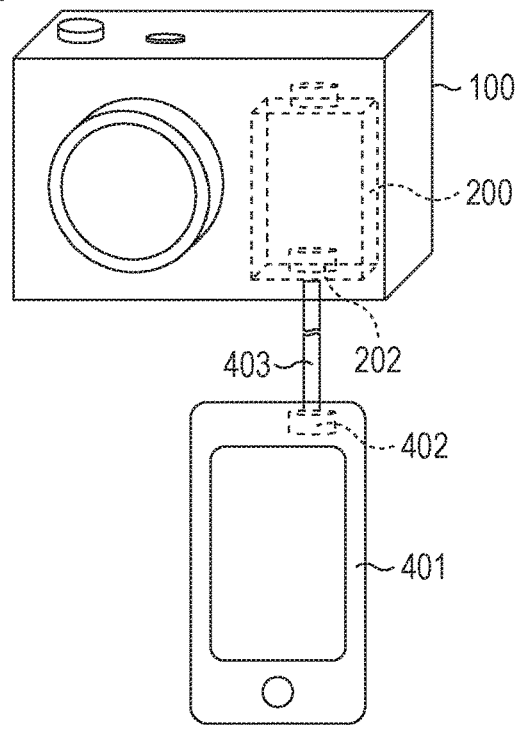
FIGS. 4A and 4B are explanatory diagrams for describing a state in which the digital camera and an external apparatus are connected to each other according to one or more aspects of the present disclosure.

For example, as illustrated in FIG. 4A, a smart phone 401 in conformity to the USB TYPE C standard is connected to the USB TYPE C connector (receptacle) 202 of the battery unit 200 in the digital camera 100, and it is possible to mutually perform the communication. Specifically, as illustrated in FIG. 4A, a USB TYPE C communication cable 403 is inserted to the USB TYPE C connector 402 included in the smart phone 401 and the USB TYPE C connector (receptacle) 202. As a result, it is possible to perform the USB 2.0 or USB 3.1 communication in conformity to the USB TYPE C standard between the digital camera 100 and the smart phone 401. In a case where the connected smart phone 401 supports the USB PD standard, the predetermined negotiation (feeding negotiation) is executed, and the digital camera 100 and the smart phone 401 can mutually perform feeding. According to the USB PD, since a feeding direction can be changed, not only power can be fed from the digital camera 100 to the smart phone 401, but also power can be fed from the smart phone 401 to the digital camera 100.

Figure 4B:
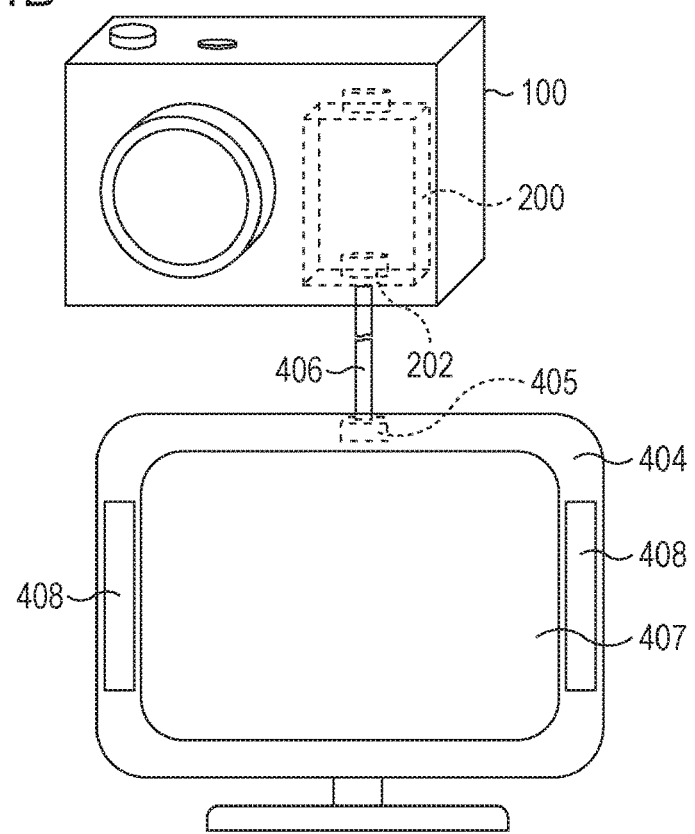

In addition, as illustrated in FIG. 4B, the external apparatus in conformity to the HDMI standard (for example, a television monitor 404) is connected to the USB TYPE C connector (receptacle) 202 of the battery unit 200 in the digital camera 100, and it is possible to perform the communication. As illustrated in FIG. 4B, a communication cable 406 is inserted to the HDMI connector 405 included in the television monitor 404 and the USB TYPE C connector 202. As a result, it is possible to perform the communication in conformity to the HDMI standard between the digital camera 100 and the television monitor 404. With this configuration, the video data and the sound data transmitted from the digital camera 100 via the HDMI data communication unit 160*b* can be output from a display unit 407 and a speaker 408 of the television monitor 404. A connector shape of one end of the communication cable 406 in this case is designed to be fit to a shape of the HDMI connector 405 of the television monitor 404, and a connector shape of the other end is designed to be fit to a shape of the USB TYPE C connector (receptacle) 202 of the battery unit 200. Furthermore, the signal line in the communication cable 406 is constituted on the basis of the signal assignment of each pin of the USB TYPE C connector (receptacle) 202 which will be described below.

Next, the assignment of the signal to the predetermined pin in the USB TYPE C connectors (receptacles) 110 and 202 and the USB TYPE C connector (plug) 201 will be described with reference to FIGS. 5A to 5C and FIGS. 6A to 6C.

FIGS. 5A to 5C are explanatory diagrams for describing the signal assignment of the USB TYPE C connectors (receptacles) 110 and 202, and FIGS. 6A to 6C are explanatory diagrams for describing the signal assignment of the USB TYPE C connector (plug) 201. As illustrated in FIGS. 5A to 5C and FIGS. 6A to 6C, the USB TYPE C connectors (receptacles) 110 and 202 and the USB TYPE C connector (plug) 201 have a two-sided pin arrangement structure including an A side and a B side. The USB TYPE C connectors (receptacles) 110 and 202 and the USB TYPE C connector (plug) 201 are connectors provided with plural types of pins including 12 pins each on the respective sides, that is, 24 pins in total.

Herein, the respective pins on the A side are referred to as A1 to A12, and the respective pins on the B side are referred to as B1 to B12. It should be noted that, when the USB TYPE C connector (receptacle) 110 is connected to the USB TYPE C connector (plug) 201, terminals having the same reference symbol are electrically connected to each other.

AS illustrated in FIGS. 5A to 5C and FIGS. 6A to 6C, each of the USB TYPE C connectors (receptacles) 110 and 202 and the USB TYPE C connector (plug) 201 can realize signal assignments of a pattern 1, a pattern 2, and a pattern 3.

The pattern 1 is the signal assignment corresponding to the USB TYPE C standard. The pattern 1 is the signal assignment that realizes the communication in conformity to the USB TYPE C standard when the external apparatus in conformity to the USB TYPE C standard is connected to the USB TYPE C connector (receptacle) 202.

The pattern 2 is the signal assignment corresponding to the HDMI standard. The pattern 2 is the signal assignment that realizes the communication in conformity to the HDMI standard when the external apparatus in conformity to the HDMI standard is connected to the USB TYPE C connector (receptacle) 202 via the communication cable 406 described above.

The pattern 3 is the signal assignment in an initial state. The pattern 3 is the signal assignment in a state in which any of the external apparatuses is not connected. The USB TYPE C connectors (receptacles) 110 and 202 in the digital camera 100 and the USB TYPE C connector (plug) 201 wait for a connection of the external apparatus in this state.

In addition, as illustrated in FIGS. 5A to 5C and FIGS. 6A to 6C, the pins A2, A3, A10, A11, B2, B3, B6, B7, B8, B10, and B11 surrounded by bold line frames among the 24 pins in total of the respective connectors are switching pins. In the signal assignment of the switching pins, the selector 190 in the digital camera 100 and the selectors 250 and 260 in the battery unit 200 described above are switched on the basis of the commands from the respective system control units.

The signal assignment in the USB TYPE C connector (receptacle) 110 of the digital camera 100 is switched by the selector 190 in the digital camera 100. The signal assignment in the USB TYPE C connector (plug) 201 of the battery unit 200 is switched by the selector 250 in the battery unit 200. The signal assignment in the USB TYPE C connector (receptacle) 202 of the battery unit 200 is switched by the selector 260 in the battery unit 200. In this manner, the USB TYPE C connectors (receptacles) 110 and 220 and the USB TYPE C connector (plug) 201 can realize the signal assignments of the pattern 1, the pattern 2, and the pattern 3 by changing the signal assignment of the switching pins.

Next, the signal assignment of the pattern 1 (corresponding to USB TYPE C) will be described. As illustrated in FIG. 5A and FIG. 6A, in the pattern 1, a GND signal is assigned to the pins A1, A12, B1, and B12. The GND signal is a ground signal corresponding to a reference potential of the digital camera 100 and the battery unit 200. A $V_{BUS}$ signal is assigned to the pins A4, A9, B4, and B9. The $V_{BUS}$ signal is a signal for exchanging power. Furthermore, the $V_{BUS}$ signal also functions as a bidirectional data communication line for performing the predetermined negotiation (feeding negotiation) corresponding to the USB PD standard.

The CC signal is assigned to the pins A5 and B5. The CC signal is a signal for exchanging information with the external apparatus in conformity to the USB TYPE C standard which is connected via the USB TYPE C connectors (receptacles) 110 and 202. When the CC signal is detected by the CC detection unit 150a of the digital camera 100 and the CC detection unit 230a in the battery unit 200, it is possible to recognize that the external apparatus in conformity to the USB TYPE C standard is connected. The CC signal also functions as a bidirectional data communication line for performing the predetermined negotiation (feeding negotiation) corresponding to the USB PD standard.

An SBU1 signal and an SBU2 signal are assigned to the pins A8 and B8. The SBU1 signal and the SBU2 signal are spare signals and do not play a particular role. A D+ signal and a D− signal are respectively assigned to the pins A6, A7, B6, and B7. The D+ signal and the D− signal are a pair of differential signals and are signals for performing a communication based on USB 2.0 standard. A TX1+ signal, a TX1− signal, an RX1− signal, and an RX1+ signal are respectively assigned to the pins A2, A3, B10, and B11, and an RX2− signal, an RX2+ signal, a TX2+ signal, and a TX2− signal are respectively assigned to the pins A10, A11, B2, and B3. The TX1+ signal and the TX1− signal, the RX1+ signal and the RX1− signal, the RX2+ signal and the RX2− signal, and the TX2+ signal and the TX2− signal are respectively a pair of differential signals. All of these signals are signals for performing a communication based on USB 3.1 standard.

As described above, in the case of the pattern 1, the pin arrangement is symmetrical. Therefore, for example, even in a case where the USB TYPE C communication cable 403 illustrated in FIG. 4A is inserted in an opposite direction, it is possible to perform the communication in conformity to the USB TYPE C standard.

Next, the signal assignment of the pattern 2 (corresponding to HDMI) will be described. As illustrated in FIG. 5B and FIG. 6B, in the pattern 2, signals (from 1 to 19) used for HDMI illustrated in FIG. 7 are assigned to the respective pins of the USB TYPE C connectors (receptacles) 110 and 220 and the USB TYPE C connector (plug) 201. It should be noted that a Reserved (NC)/Utility signal of No. 14 and a CEC signal of No. 13 are generally not used in a digital camera and are therefore not assigned. Hereinafter, the switching pins different from the signal assignment of the pattern 1 (corresponding to USB TYPE C) will be described.

In the pattern 2 (corresponding to HDMI), a TMDS Data0+ signal and a TMDS Data0− signal of the HDMI signals are respectively assigned to the switching pins A2 and A3 surrounded by bold line frames. A TMDS Data2+ signal and a TMDS Data2− signal are respectively assigned to the switching pins A10 and A11. A TMDS CLOCK1− signal and a TMDS CLOCK1+ signal are respectively assigned to the switching pins B2 and B3. A TMDS Data1− signal and a TMDS Data1+ signal are respectively assigned to the switching pins B10 and B11.

Herein, the TMDS Data0+ signal and the TMDS Data0− signal and the TMDS Data2+ signal and the TMDS Data2− signal are respectively a pair of differential signals. In addition, the TMDS CLOCK1+ signal and the TMDS CLOCK1− signal and the TMDS Data1+ signal and the TMDS Data1− signal are respectively a pair of differential signals. These signals are used to transmit the respective signals of the video data and the sound data as the digital signals.

DDC signals constituted by SCL and SDA are respectively assigned to the switching pins B6 and B7. The DDC signal is used to read out information such as a display performance and an attribute of the external apparatus in conformity to the HDMI standard which is connected to the digital camera 100. The HPD signal is assigned to the switching pin B8. It is possible to detect a connection of the external apparatus in conformity to HDMI by using the HPD signal. When the HPD signal is detected by the HPD detection unit 160a of the digital camera 100 and the HPD detection unit 240a in the battery unit 200, it is possible to recognize the connection of the external apparatus in conformity to the HDMI standard. In the addition to the above, since +5 VPower uses $V_{bus}$ signals of A4, A9, B4, and B9 and various shield signals use the GND pins of A1, A12, B1, and B12, switching does not need to be performed. In addition, the signal assignment at the pins other than the switching pins remains the pattern 1 (corresponding to USB TYPE C) and is common without changes.

As described above, in the case of the pattern 2, the signals used in HDMI illustrated in FIG. 7 are 19 types, and also, as illustrated in FIG. 5B and FIG. 6B, the pin arrangement is asymmetrical. Therefore, for example, in a case where the HPD signal in which the communication cable 406 illustrated in FIG. 4B is inserted in the opposite direction is not input to the battery unit 200, the digital camera 100 does not detect the connection of the external apparatus in conformity to HDMI. In this case, the signal assignment becomes the pattern 3 which will be described below instead of the pattern 2.

Next, the signal assignment of the pattern 3 (initial state) will be described. As illustrated in FIG. 5C and FIG. 6C, in the pattern 3, no signals are assigned to the pins A2, A3, A10, A11, B2, B3, B6, B7, B10, and B11 among the switching pins. On the other hand, since the HPD signal can be input, the HPD signal is assigned to only the switching pin B8. In addition, the GND signal of the pins A1, A12, B1, and B12, the $V_{BUS}$ signal of the pins A4, A9, B4, and B9, the CC signal of the pins A5 and B5, and the D+ signal and the D− signal of the pins A6 and A7 are all used in both of the patterns 1 and 2 without changes.

As described above, the USB TYPE C connectors (receptacles) 110 and 202 and the USB TYPE C connector (plug) 201 can realize the signal assignments of the patterns 1 to 3 when the signal assignment of the switching pins surrounded by bold line frames are switched. In addition, the GND signal, the $V_{BUS}$ signal, the CC signal, the D+ signal, and the D− signal are regularly assigned to the same pins in the patterns 1 to 3. That is, the pins having the same reference symbols of the USB TYPE C connectors (receptacles) 110 and 202 and the USB TYPE C connector (plug) 201 are in a state of regularly being connected via the respective signals as illustrated in FIG. 3.

Figure 8A:
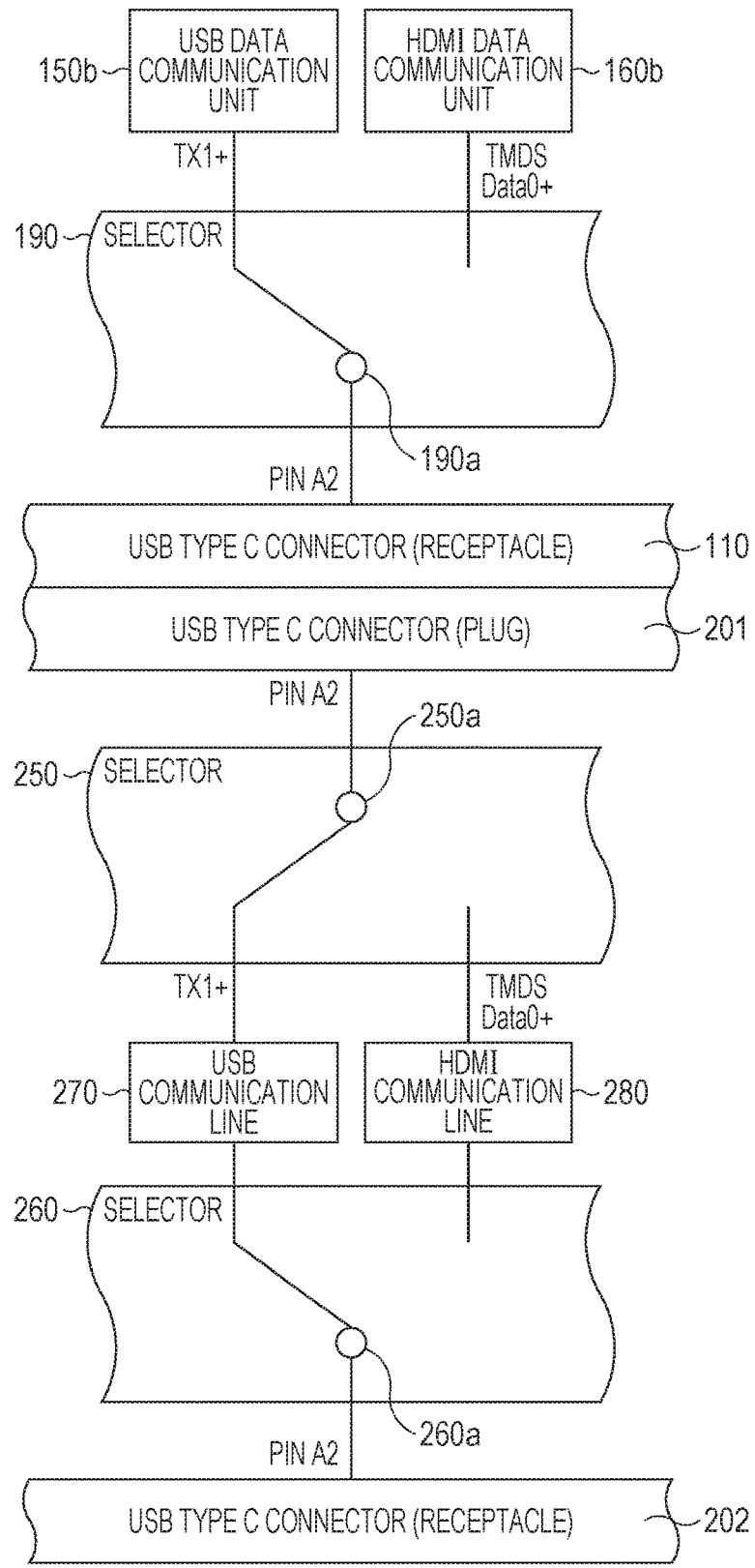
FIGS. 8A to 8C are explanatory diagrams for describing switching of a switch element in accordance with a communication standard and according to one or more aspects of the present disclosure.
Figure 8B:
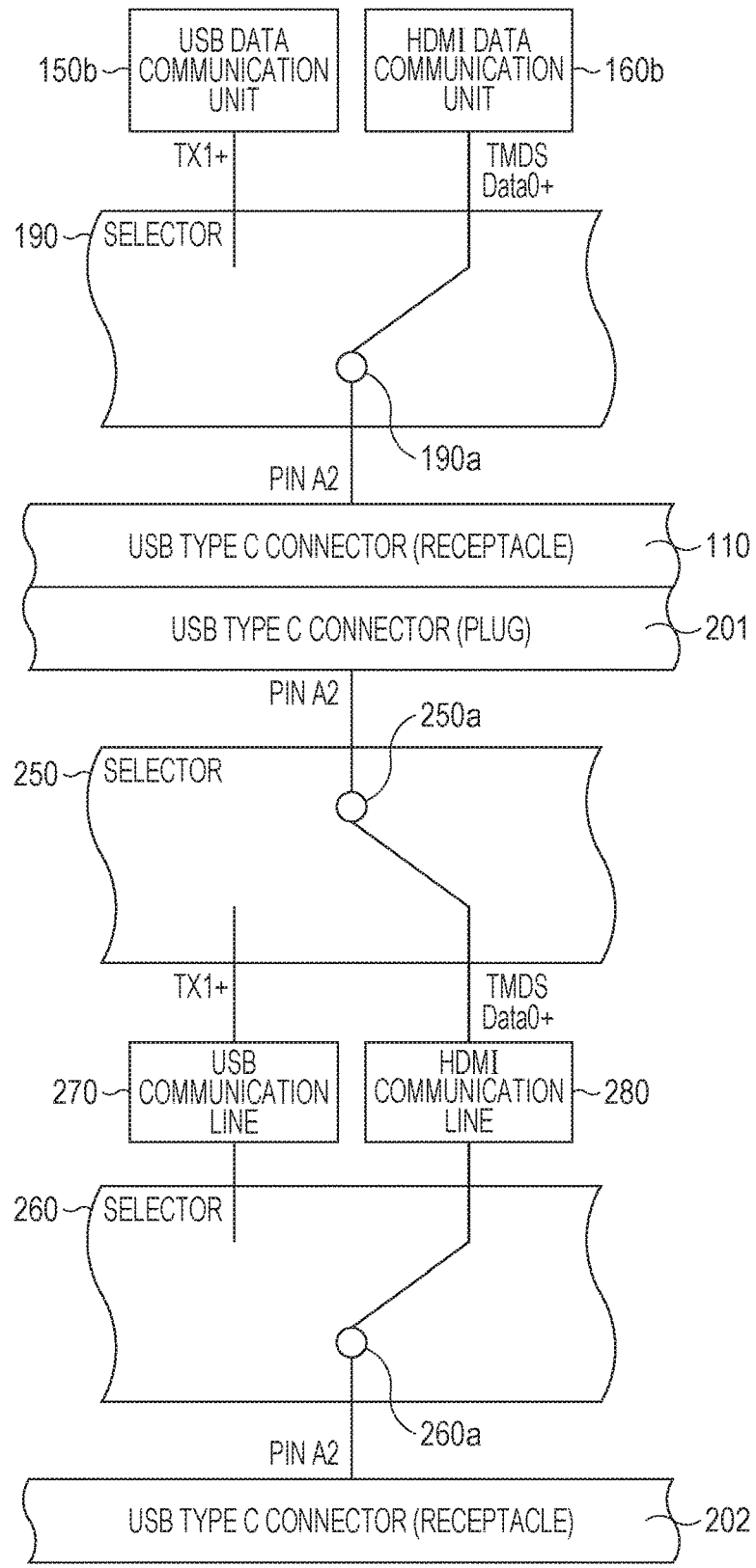

Next, details of connection configurations among the respective connectors, the selectors 190, 250, and 260, the USB data communication unit 150b, the HDMI data communication unit 160b, the USB communication line 270, and the HDMI communication line 280 will be described with reference to FIGS. 8A to 8C.

The selector 190 includes a switching element 190a configured to respectively switch the connection destinations of the switching pins of the USB TYPE C connector (receptacle) 110 in the digital camera 100 to the USB control unit 150 or the HDMI control unit 160. The selector 250 includes a switching element 250a configured to respectively switch the connection destinations of the switching pins of the USB TYPE C connector (plug) 201 in the battery unit 200 to the USB communication line 270 or the HDMI communication line 280. The selector 260 includes a switching element 260a configured to respectively switch the connection destinations of the switching pins of the USB TYPE C connector (receptacle) 202 in the battery unit 200 to the USB communication line 270 or the HDMI communication line 280. In FIGS. 8A to 8C, descriptions will be given by using the pin A2 as a representative among the switching pins. Here, a state will be described in which the respective switching pins are switched to predetermined connection destinations by the respectively corresponding selectors, but a detailed flow related to the switching processing will be described below.

First, the case of the pattern 1 (corresponding to USB TYPE C) will be described. As illustrated in FIG. 8A, the switching element 190a of the selector 190 selects the TX1+ signal for the USB 3.1 communication of the USB data communication unit 150b on the basis of the command from the system control unit 170 of the digital camera 100. The switching element 250a of the selector 250 selects the TX1+ signal of the USB communication line 270 on the basis of the command from the system control unit 220 of the battery unit 200. The switching element 260a of the selector 260 selects the TX1+ signal of the USB communication line 270 on the basis of the command from the system control unit 220 of the battery unit 200.

In this manner, the USB TYPE C connectors (receptacles) 110 and 202 correspond to the signal assignment of FIG. 5A, and the USB TYPE C connector (plug) 201 corresponds to the signal assignment of FIG. 6A. With this configuration, the connection from the USB data communication unit 150b in the digital camera 100 to the USB TYPE C connector (receptacle) 202 of the battery unit 200 is established on the TX1+ signal at the pin A2. It should be noted that the similar switching is also performed with regard to the other switching pins A3, A10, A11, B2, B3, B6, B7, B8, B10, and B11.

Next, the case of the pattern 2 (corresponding to HDMI) will be described. As illustrated in FIG. 8B, the switching element 190a of the selector 190 selects the TMDS Data2+ signal of the HDMI data communication unit 160b on the basis of the command from the system control unit 170 of the digital camera 100. The switching element 250a of the selector 250 selects the TMDS Data2+ signal of the HDMI communication line 280 on the basis of the command from the system control unit 220 of the battery unit 200. The switching element 260a of the selector 260 selects the TMDS Data2+ signal of the HDMI communication line 280 on the basis of the command from the system control unit 220 of the battery unit 200.

In this manner, the USB TYPE C connectors (receptacles) 110 and 202 correspond to the signal assignment of FIG. 5B, and the USB TYPE C connector (plug) 201 corresponds to the signal assignment of FIG. 6B. With this configuration, the connection from the HDMI data communication unit 160b in the digital camera 100 to the USB TYPE C connector (receptacle) 202 of the battery unit 200 is established on the TMDS Data2+ signal at the pin A2. It should be noted that the similar switching is also performed with regard to the other switching pins A3, A10, A11, B2, B3, B6, B7, B8, B10, and B11.

Next, the case of the pattern 3 (initial state) will be described. As illustrated in FIG. 8C, the switching element 190a of the selector 190 does not select either the USB data communication unit 150b or the HDMI data communication unit 160b on the basis of the command from the system control unit 170 of the digital camera 100. The switching element 250a of the selector 250 does not select either the USB communication line 270 or the HDMI communication line 280 on the basis of the command from the system control unit 220 of the battery unit 200. The switching element 260a of the selector 260 does not select either the USB communication line 270 or the HDMI communication line 280 on the basis of the command from the system control unit 220 of the battery unit 200.

In this manner, the USB TYPE C connectors (receptacles) 110 and 202 correspond to the signal assignment of FIG. 5C, and the USB TYPE C connector (plug) 201 corresponds to the signal assignment of FIG. 6C. With this configuration, the connection from the HDMI data communication unit 160b in the digital camera 100 to the USB TYPE C connector (receptacle) 202 of the battery unit 200 is put into an open state at the pin A2. It should be noted that the similar switching is also performed with regard to the other switching pins A3, A10, A11, B2, B3, B6, B7, B8, B10, and B11.

Figure 8C:
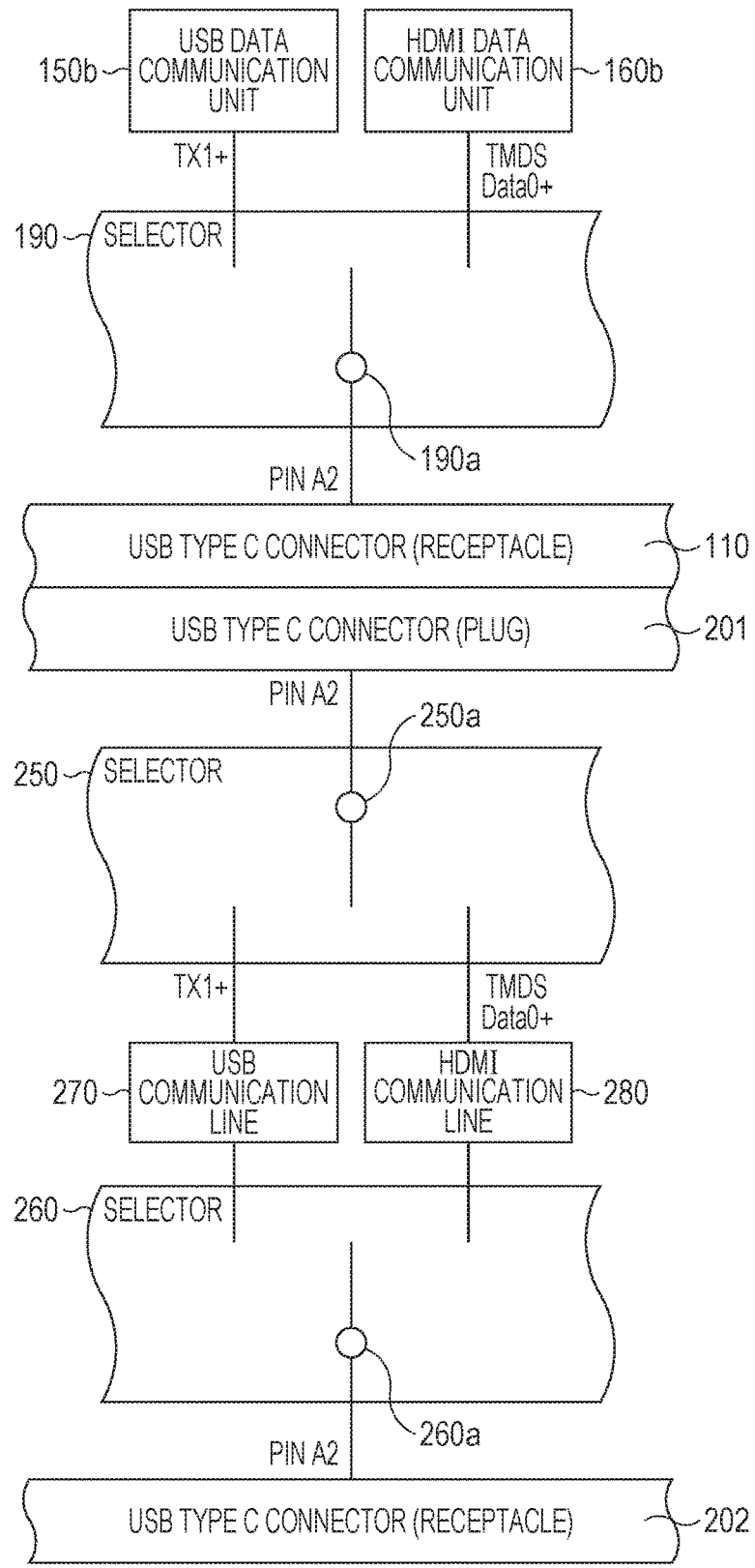

In addition, for example, in a case where the communication cable 406 illustrated in FIG. 4B is inserted in the opposite direction, as illustrated in FIG. 8C, since any of the switching elements are selected, it is possible to avoid the failure of the apparatus caused by the signal collisions.

As described above, the signal assignments of the respective switching pins are switched by the respective selectors. Then, the initial state of the digital camera 100, that is, the state in which the external apparatus is not connected regularly corresponds to the state of FIG. 8C, and the state is appropriately switched to the state of FIG. 8A or FIG. 8B on the basis of the commands from the respective system control units.

Figure 9:
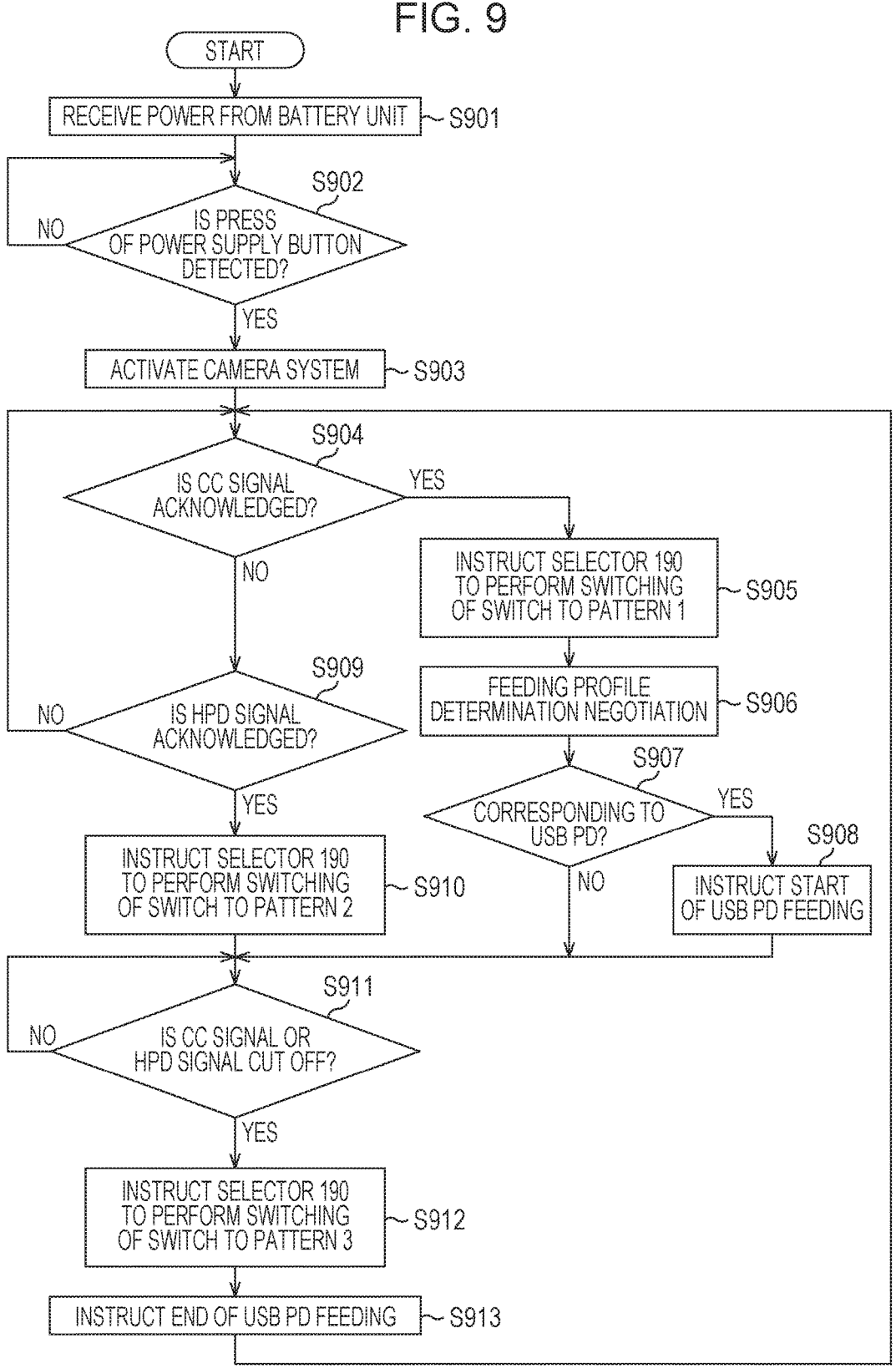
FIG. 9 is a flow chart illustrating an example of communication switching processing by the digital camera according to one or more aspects of the present disclosure.

FIG. 9 is a flow chart illustrating an example of communication switching processing by the digital camera 100 according to the present exemplary embodiment.

First, when the battery unit 200 is connected via the USB TYPE C connector (receptacle) 110, the processing is started. Then, in S901, the power supply control unit 180 receives power via the $V_{BUS}$ signal from the battery unit 200. Next, in S902, the system control unit 170 waits until it is detected that the power supply button 104 is pressed by the user operation. Then, when the system control unit 170 detects the press of the power supply button 104, the processing proceeds to S903. Then, in S903, the system control unit 170 activates the entirety of the digital camera 100.

Next, in S904, it is determined whether or not the external apparatus in conformity to the USB TYPE C standard is connected to the USB TYPE C connector (receptacle) 202 of the battery unit 200. That is, it is determined whether or not the CC detection unit 150a of the USB control unit 150 receives the CC signal from the USB TYPE C connector (receptacle) 110. In a case where the CC detection unit 150a receives the CC signal, the processing proceeds to S905. In a case where the CC detection unit 150a does not receive the CC signal, the processing proceeds to S909.

In S905, the system control unit 170 receives a detection signal from the CC detection unit 150a and thereafter issues the switching instruction to the selector 190 to switch the switching pins of the USB TYPE C connector (receptacle) 110 to the pattern 1. That is, the selector 190 switches the assignments of the respective switching pins by the switching element 190a on the basis of the command from the system control unit 170 as described with reference to FIG. 8A. Then, the selector 190 switches the signal assignment from the pattern 3 (initial state) of FIG. 5C to the pattern 1 (corresponding to USB TYPE C) of FIG. 5A.

Next, in S906, the PD control unit 150c executes the predetermined negotiation (feeding negotiation) with the external apparatus via the CC signal or the $V_{BUS}$ signal and determines a feeding profile. Next, in S907, the PD control unit 150c checks whether or not the external apparatus is an apparatus corresponding to the USB PD standard on the basis of the result of the predetermined negotiation. In a case where the PD control unit 150c determines that the external apparatus is the apparatus corresponding to the USB PD standard, the processing proceeds to S908. In a case where the PD control unit 150c determines that the external apparatus is not the apparatus corresponding to the USB PD standard, the processing proceeds to S911.

In S908, the PD control unit 150c starts USB PD feeding in accordance with the feeding profile determined in S906. It should be noted that the switching instruction of the switching pins to the selector 190 in S905 may be performed after the series of the USB PD processings in steps S906 to S908.

On the other hand, in S909, it is determined whether or not the external apparatus in conformity to the HDMI standard is connected to the USB TYPE C connector (receptacle) 202 of the battery unit 200. That is, the HPD detection unit 160a of the HDMI control unit 160 determines whether or not the HPD signal is received from the USB TYPE C connector (receptacle) 110. In a case where it is determined that the HPD detection unit 160a receives the HPD signal, the processing proceeds to S910. In a case where it is determined that the HPD detection unit 160a does not receive the HPD signal, the processing returns to S904.

In S910, the system control unit 170 receives the detection signal from the HPD detection unit 160a and thereafter issues the switching instruction to the selector 190 to switch the switching pins of the USB TYPE C connector (receptacle) 110 to the pattern 2. That is, the selector 190 switches the assignments of the respective switching pins by the switching element 190a on the basis of the command from the system control unit 170 as described with reference to FIG. 8B. Then, the selector 190 switches the signal assignment from the pattern 3 (initial state) of FIG. 5C to the pattern 2 (corresponding to HDMI) of FIG. 5B.

Next, in step S911, it is determined whether or not the external apparatus connected to the USB TYPE C connector (receptacle) 202 of the battery unit 200 is detached. That is, the system control unit 170 determines whether or not the external apparatus in conformity to the USB TYPE C standard is detached and the detection of the CC signal is cut off or whether or not the external apparatus in conformity to the HDMI standard is detached and the detection of the HPD signal is cut off. In a case where the system control unit 170 determines that the signal detection is cut off, the processing proceeds to S912. In a case where the system control unit 170 determines that the signal detection is not cut off, the processing in S911 is repeated.

In S912, the system control unit 170 issues the switching instruction to the selector 190 to switch the switching pins of the USB TYPE C connector (receptacle) 110 to the pattern 3. That is, the selector 190 switches the assignments of the respective switching pins by the switching element 190a on the basis of the command from the system control unit 170 as described with reference to FIG. 8C. Then, the selector 190 returns the signal assignment to the pattern 3 (initial state) of FIG. 5C.

Next, in S913, in a case where the feeding is performed on the basis of USB PD, the PD control unit 150c ends the USB PD feeding, and the processing returns to S903.

It should be noted that the processing illustrated in FIG. 9 is repeated as long as the power supply is ON while the battery unit 200 remains mounted. On the other hand, in a case where the power supply button 104 is pressed in the middle of the processing to turn the power supply OFF, the system control unit 170 interrupts the repeating pattern illustrated in FIG. 9, and the processing returns to S902. In a case where the battery unit 200 is detached from the digital camera 100 or a case where the charge of the battery unit 200 runs out, the processing illustrated in FIG. 9 is ended. Whether or not the battery unit 200 is detached from the digital camera 100 can be determined by determining whether or not the power supply is stopped from the battery unit 200 to the power supply control unit 180. In a case where the power supply is turned OFF or a case where the battery unit 200 is detached, the selector 190 returns the signal assignment to the pattern 3 (initial state) of FIG. 5C.

Figure 10:
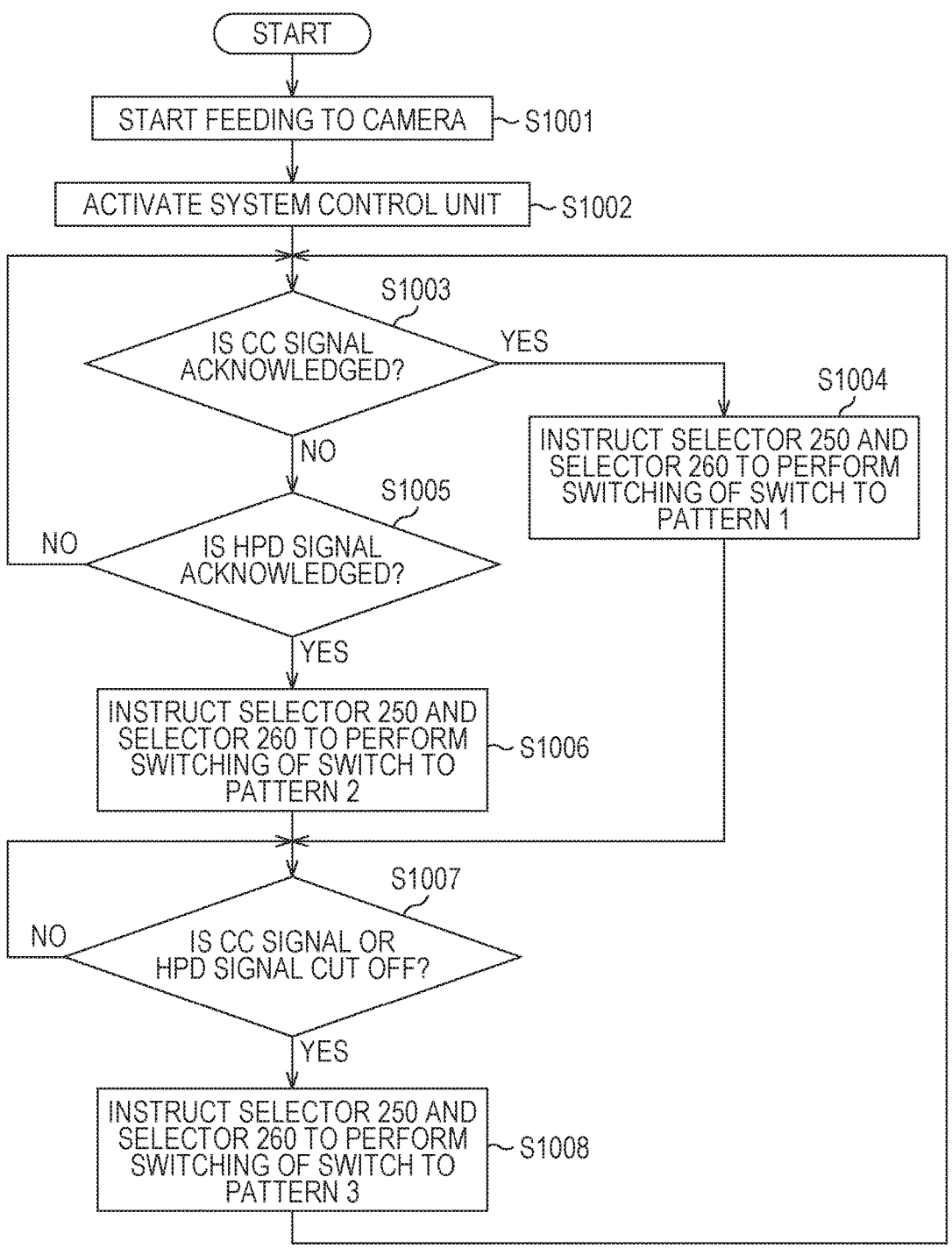
FIG. 10 is a flow chart illustrating an example of communication switching processing by the battery unit according to one or more aspects of the present disclosure.

FIG. 10 is a flow chart illustrating an example of communication switching processing by the battery unit 200 according to the present exemplary embodiment.

First, when the battery unit 200 is connected via the USB TYPE C connector 110 of the digital camera 100, the processing is started. Then, in S1001, the system control unit 220 starts feeding from the battery cell 210 to the digital camera 100. Next, in S1002, when the power supply button 104 of the digital camera 100 is pressed by the user operation, the system control unit 220 starts the overall activation by receiving power from the battery cell 210.

Next, in S1003, the battery unit 200 determines whether or not the external apparatus in conformity to the USB TYPE C standard is connected to the USB TYPE C connector (receptacle) 202. That is, it is determined whether or not the CC detection unit 230a of the USB control unit 230 receives the CC signal from the USB TYPE C connector (receptacle) 202. In a case where it is determined that the CC detection unit 230a receives the CC signal, the processing proceeds to S1004. In a case where it is determined that the CC detection unit 230a does not receive the CC signal, the processing proceeds to S1005.

In S1004, the system control unit 220 receives the detection signal from the CC detection unit 230a and thereafter issues the switching instruction to the selectors 250 and 260 to switch the switching pins of the USB TYPE C connector (plug) 201 to the pattern 1. That is, the selectors 250 and 260 switch the assignments of the respective switching pins by the switching element 250a on the basis of the command from the system control unit 220 as described with reference to FIG. 8A. Then, the selectors 250 and 260 switch the signal assignment from the pattern 3 (initial state) of FIG. 6C to the pattern 1 (corresponding to USB TYPE C) of FIG. 6A.

On the other hand, in S1005, it is determined whether or not the external apparatus in conformity to the HDMI standard is connected to the USB TYPE C connector (receptacle) 202 of the battery unit 200. That is, it is determined whether or not the HPD detection unit 240a of the HDMI control unit 240 receives the HPD signal from the USB TYPE C connector (receptacle) 202. In a case where it is determined that the HPD detection unit 240a receives the HPD signal, the processing proceeds to S1006. In a case where it is determined that the HPD detection unit 240a does not receive the HPD signal, the processing returns to S1003.

In S1006, the system control unit 220 receives the detection signal from the HPD detection unit 240a and thereafter issues the switching instruction to the selectors 250 and 260 to switch the switching pins of the USB TYPE C connector (plug) 201 to the pattern 2. That is, the selectors 250 and 260 switch the assignments of the respective switching pins by the switching element 250a on the basis of the command from the system control unit 220 as described with reference to FIG. 8B. Then, the selectors 250 and 260 switch the signal assignment from the pattern 3 (initial state) of FIG. 6C to the pattern 2 (corresponding to HDMI) of FIG. 6B.

Next, in S1007, it is determined whether or not the external apparatus connected to the USB TYPE C connector (receptacle) 202 of the battery unit 200 is detached. That is, the system control unit 220 determines whether or not the external apparatus in conformity to the USB TYPE C standard is detached and the detection of the CC signal is cut off or the external apparatus in conformity to the HDMI standard is detached and the detection of the HPD signal is cut off. In a case where the system control unit 220 determines that the signal detection is cut off, the processing proceeds to S1008. In a case where the system control unit 220 determines that the signal detection is not cut off, the processing in S1007 is repeated.

In S1008, the system control unit 220 issues the switching instruction to the selectors 250 and 260 to switch the switching pins of the USB TYPE C connector (plug) 201 to the pattern 3. That is, the selectors 250 and 260 switch the assignments of the respective switching pins by the switching element 250a on the basis of the command from the system control unit 220 as described with reference to FIG. 8C. Then, the selectors 250 and 260 return the signal assignment to the pattern 3 (initial state) of FIG. 6C, and the processing returns to S1003.

It should be noted that the processing illustrated in FIG. 10 is repeated as long as the power supply is ON while the battery unit 200 remains mounted. On the other hand, in a case where the power supply button 104 is pressed in the middle of the processing to turn the power supply OFF, the system control unit 220 interrupts the repeating pattern illustrated in FIG. 10, and the processing returns to S1002. In a case where the battery unit 200 is detached from the digital camera 100 or a case where the charge of the battery unit 200 runs out, the processing illustrated in FIG. 10 is ended. Whether or not the battery unit 200 is detached from the digital camera 100 can be determined while the system control unit 220 determines whether or not feeding is stopped from the battery cell 210 to the digital camera 100. In a case where the power supply is turned OFF or a case where the battery unit 200 is detached, the selectors 250 and 260 return the signal assignment to the pattern 3 (initial state) of FIG. 5C.

As described above, according to the present exemplary embodiment, it is possible to perform the communication by switching the communication in conformity to the USB TYPE C standard and the communication in conformity to the HDMI standard via only the USB TYPE C connector. In addition, it is possible to perform the communication by switching the communication in conformity to the USB TYPE C standard and the communication in conformity to the HDMI standard in accordance with the external apparatus connected to the USB TYPE C connector. At this time, after the external apparatus connected by after the CC signal or the HPD signal is acknowledged, the connection of the switching pin is switched by the selector, and then the communication is started. With this configuration, a state is avoided in which the connection destination of the switching pin and the communication standard of the external apparatus are unmatched and the signal lines are collided with each other, and it is possible to effectively avoid the apparatus failure. In addition, since the connection destination based on the selector of the switching pin is not particularly limited, the degree of freedom for designing the signal assignment for the USB TYPE C connector is increased, and also it is possible to effectively utilize the respective pins.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-132620 filed Jul. 4, 2016, which is hereby incorporated by reference herein in its entirety.

What is claimed is:

1. An electronic device comprising:
    a connector constituted by plural types of pins, including a plurality of switching pins and a plurality of common pins, and configured to perform a communication in accordance with at least one of a first communication standard for requesting a symmetrical pin arrangement and a second communication standard for requesting an asymmetrical pin arrangement;
    a first detection circuit connected to at least one pin of the plurality of common pins and configured to detect that a communication standard an external apparatus connected to the connector conforms to is the first communication standard based on a first signal input to at least one of symmetrically arranged pins among the plurality of common pins;
    a second detection circuit connected to at least one pin of the plurality of switching pins and configured to detect that a communication standard an external apparatus connected to the connector conforms to is the second communication standard based on a second signal input to a predetermined pin of the plurality of switching pins; and
    a control unit configured to
    set the plurality of switching pins except for the predetermined pin thereof to be not used for the first communication standard and the second communication standard until at least one of the first signal and the second signal is detected,
    in a case where the communication standard the external apparatus conforms to is the first communication standard, set the switching pins, including the predetermined pin, to be used as a symmetrical pin arrangement, and
    in a case where the communication standard the external apparatus conforms to is the second communication standard, set the switching pins to be used as an asymmetrical pin arrangement.

2. The electronic device according to claim 1, wherein, in a case where the switching pins are set to be used as the asymmetrical pin arrangement in response to the determination made that the communication standard the external apparatus conforms to is the second communication standard, the arrangement of the pins used for determining that the communication standard the external apparatus conforms to is the second communication standard is not changed.

3. The electronic device according to claim 1, wherein the connector is a USB TYPE C connector.

4. The electronic device according to claim 1,
    wherein the first communication standard is a communication standard in conformity to a USB TYPE C standard, and
    wherein the second communication standard is a communication standard in conformity to an HDMI standard.

5. The electronic device according to claim 4, wherein the input unit inputs a CC signal for detecting a connection of the external apparatus in conformity to the USB TYPE C standard or an HPD signal for detecting a connection of the external apparatus in conformity to the HDMI standard.

6. A control method for an electronic device including a connector constituted by plural types of pins, including a plurality of switching pins and a plurality of common pins, and configured to perform a communication in accordance with a first communication standard for requesting a symmetrical pin arrangement or a second communication standard for requesting an asymmetrical pin arrangement, the control method comprising:
    detecting, by a first detection circuit connected to at least one pin of the plurality of common pins, that a communication standard an external apparatus connected to the connector conforms to is the first communication standard based on a first signal input to at least one of symmetrically arranged pins among the plurality of common pins;
    detecting, by a second detection circuit connected to at least one pin of the plurality of switching pins, that a communication standard an external apparatus connected to the connector conforms to is the second communication standard based on a second signal input to a predetermined pin of the plurality of switching pins; and
    setting the plurality of switching pins except for the predetermined pin thereof to be not used for the first communication standard and the second communication standard until at least one of the first signal and the second signal is detected,
    in a case where the communication standard the external apparatus conforms to is the first communication standard, set the switching pins, including the predetermined pin, to be used as a symmetrical pin arrangement, and
    in a case where the communication standard the external apparatus conforms to is the second communication standard, set the switching pins to be used as an asymmetrical pin arrangement.

7. The control method for the electronic device according to claim 6, wherein, in a case where the switching pins are set to be used as the asymmetrical pin arrangement in response to the determination made that the communication standard the external apparatus conforms to is the second communication standard, the arrangement of the pins used for determining that the communication standard the external apparatus conforms to is the second communication standard is not changed.

8. The control method for the electronic device according to claim 6, wherein the connector is a USB TYPE C connector.

9. The control method for the electronic device according to claim 6, wherein the first communication standard is a communication standard in conformity to a USB TYPE C standard, and wherein the second communication standard is a communication standard in conformity to an HDMI standard.

10. The control method for the electronic device according to claim 9, wherein the inputting includes inputting a CC signal for detecting a connection of the external apparatus in conformity to the USB TYPE C standard or an HPD signal for detecting a connection of the external apparatus in conformity to the HDMI standard.

11. A non-transitory computer-readable storage medium which stores a program for causing a computer to execute a control method for an electronic device including a connector constituted by plural types of pins, including a plurality of switching pins and a plurality of common pins, and configured to perform a communication in accordance with a first communication standard for requesting a symmetrical pin arrangement or a second communication standard for requesting an asymmetrical pin arrangement, the method comprising:

detecting, by a first detection circuit connected to at least one pin of the plurality of common pins, that a communication standard an external apparatus connected to the connector conforms to is the first communication standard based on a first signal input to at least one of symmetrically arranged pins among the plurality of common pins;

detecting, by a second detection circuit connected to at least one pin of the plurality of switching pins, that a communication standard an external apparatus connected to the connector conforms to is the second communication standard based on a second signal input to a predetermined pin of the plurality of switching pins; and setting the plurality of switching pins except for the predetermined pin thereof to be not used for the first communication standard and the second communication standard until at least one of the first signal and the second signal is detected, in a case where the communication standard the external apparatus conforms to is the first communication standard, set the switching pins, including the predetermined pin, to be used as a symmetrical pin arrangement, and in a case where the communication standard the external apparatus conforms to is the second communication standard, set the switching pins to be used as an asymmetrical pin arrangement.

* * * * *